US012717753B2

(12) United States Patent
Jain et al.

(10) Patent No.: US 12,717,753 B2
(45) Date of Patent: Aug. 25, 2026

(54) STREAMLINING PROCESSING AND TRANSPORT OF ARTIFACTS IN AIR-GAPPED NETWORKS

(71) Applicant: PALANTIR TECHNOLOGIES INC., Denver, CO (US)

(72) Inventors: Ashray Jain, Seattle, WA (US); Bradley Moylan, Torrance, CA (US); Callum Rogers, London (GB); Charissa Sonder Plattner, New York, NY (US)

(73) Assignee: Palantir Technologies Inc., Aventura, FL (US)

( * ) Notice: Subject to any disclaimer, the term of this patent is extended or adjusted under 35 U.S.C. 154(b) by 0 days.

(21) Appl. No.: 19/012,299

(22) Filed: Jan. 7, 2025

(65) Prior Publication Data

US 2025/0209038 A1 Jun. 26, 2025

Related U.S. Application Data

(63) Continuation of application No. 18/209,387, filed on Jun. 13, 2023, now Pat. No. 12,189,572.

(60) Provisional application No. 63/438,006, filed on Jan. 10, 2023.

(51) Int. Cl.

*G06F 16/11* (2019.01)
*G06F 16/174* (2019.01)
*G06F 21/64* (2013.01)

(52) U.S. Cl.

CPC .......... *G06F 16/113* (2019.01); *G06F 16/125* (2019.01); *G06F 16/1744* (2019.01); *G06F 21/64* (2013.01)

(58) Field of Classification Search

CPC .. G06F 16/113; G06F 16/125; G06F 16/1744; G06F 21/64

See application file for complete search history.

(56) References Cited

U.S. PATENT DOCUMENTS

| | | | | |
|---|---|---|---|---|
| 11,675,913 | B2 * | 6/2023 | Wolfson | G06F 21/629 713/189 |
| 12,242,879 | B2 * | 3/2025 | Gao | H04L 9/0643 |
| 2018/0121485 | A1 | 5/2018 | Jayanthi et al. | |
| 2020/0065409 | A1 | 2/2020 | Batts | |
| 2020/0097662 | A1 * | 3/2020 | Hufsmith | H04L 9/0643 |
| 2020/0250319 | A1 | 8/2020 | Bacher et al. | |
| 2021/0011885 | A1 | 1/2021 | Liu et al. | |
| 2021/0271657 | A1 | 9/2021 | Delsman et al. | |

(Continued)

OTHER PUBLICATIONS

Non-Final Office Action dated Apr. 19, 2024, issued in related U.S. Appl. No. 18/209,387 (11 pages).

(Continued)

*Primary Examiner* — Dangelino N Gortayo

(74) *Attorney, Agent, or Firm* — Sheppard Mullin Richter & Hampton LLP

(57) ABSTRACT

Computing systems methods, and non-transitory storage media are provided for obtaining images, extracting layers from each of the images, extracting segments from each of the layers, generating a compressed version of the segments by storing a single copy of each segment and metadata to reconstruct the layers from the segments and the images from the layers, and simulating a reconstruction of the image from the compressed version.

20 Claims, 17 Drawing Sheets

(56) References Cited

U.S. PATENT DOCUMENTS

| | | | | |
|---|---|---|---|---|
| 2021/0382997 | A1* | 12/2021 | Yi | G06F 21/577 |
| 2022/0374395 | A1* | 11/2022 | Scrivano | G06F 16/1744 |
| 2023/0161736 | A1 | 5/2023 | Scrivano | |
| 2023/0266955 | A1* | 8/2023 | Li | G06F 9/45558 717/174 |

OTHER PUBLICATIONS

Notice of Allowance mailed Aug. 28, 2024, issued in related U.S. Appl. No. 18/209,387 (10 pages).

* cited by examiner

STREAMLINING PROCESSING AND TRANSPORT OF ARTIFACTS IN AIR-GAPPED NETWORKS

CROSS REFERENCE TO RELATED APPLICATIONS

This application is a continuation of U.S. application Ser. No. 18/209,387, filed Jun. 13, 2023, which claims the benefit under 35 U.S.C. § 119(e) of U.S. Provisional Application Ser. No. 63/438,006, filed Jan. 10, 2023, the content of which is incorporated by reference in its entirety into the present disclosure.

BACKGROUND

Segmenting or packaging applications into infrastructure, such as containers, has provided a cornucopia of benefits including elastic scalability of developing different portions or extents of the applications due to applications being broken up into smaller portions, isolation of running the applications from other processes or resources, portability of moving the applications due to their decoupling from underlying hardware and/or software infrastructure of a host machine, operating system independence, and efficiency of development and rollback. However, the transport and processing of containers has remained a bottleneck that has hampered the efficiency of application development and execution.

SUMMARY

Various examples of the present disclosure can include computing systems, methods, and non-transitory computer readable media configured to perform: obtaining images or templates. The images or templates may be obtained, for example, from a registry. The images or templates include logic, dependencies, and libraries, and any operation system components. The images or templates represent schemas of containers or other infrastructure. The images or templates include an executable bundle encompassing binary data, which encapsulates an application and any dependencies. The images or templates may be separated into segments, divisions, portions, or compartments, such as layers. The computing systems are further configured to perform extracting layers from each of the images or templates, extracting further segments from the layers, such as individual files, and generating a compressed version of the images or templates by storing a single copy of each file while skipping storage of any repeated files, within an archive. The computing systems may further be configured to store metadata within the archive. The metadata indicates constituent files within each of the layers. The metadata is used to reconstruct the layers using the stored single copy of each file. The metadata may be in a format of JavaScript Object Notation (JSON) objects or logs. The computing systems may further be configured to simulate reconstruction of the layers from the archive based on the metadata.

In some examples, the computing systems may further be configured to verify the copy of each file based on a checksum of each copy within the archive.

In some examples, the computing systems may further be configured to, in response to a failed simulated reconstruction of the layers, delete the archive and store the layers (e.g., an uncompressed version of the image rather than a compressed version). If the simulated reconstruction of the layers is successful, then the archive is transported to a different computing environment or network. If the simulated reconstruction of the layers is unsuccessful, then the layers (e.g., an uncompressed version) are transported to the different computing environment or network. The different computing environment or network may encompass an air-gapped, sandboxed or secured environment.

In some examples, the metadata includes absolute or relative paths of each file and security or access control attributes of each file.

In some examples, the further segments may include external references to external files, such as an external Java ARchive (JAR).

In some examples, the metadata further includes constituent layers within the image.

In some examples, the generating of the compressed version may include iteratively storing a single copy of each file until an amount of stored files in the archive reaches a threshold storage amount. In some examples, the threshold storage amount is 5 GB.

In some examples, the images or templates may be obtained from different computing clusters.

In some examples, in response to the generating of the compressed version of the images or templates, the computing systems are further configured to scan the compressed version of the images or templates. In some examples, the scanning of the compressed version is in response to a successful simulated reconstruction of the layers.

In some examples, each subsequent layer represents a change or an addition to an immediate preceding layer. At least a portion of the layers may include libraries, dependencies, or configuration files.

These and other features of the computing systems, methods, and non-transitory computer readable media disclosed herein, as well as the methods of operation and functions of the related elements of structure and the combination of parts, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings. Any principles or concepts illustrated in one figure may be applicable to any other relevant figures. For example, principles illustrated in FIG. 1 may also be applicable to any of FIGS. 2A, 2B, 2C, 3, 4A, 4B, 5A, 5B, 5C, 6-8, and vice versa.

DETAILED DESCRIPTION

Figure 1:
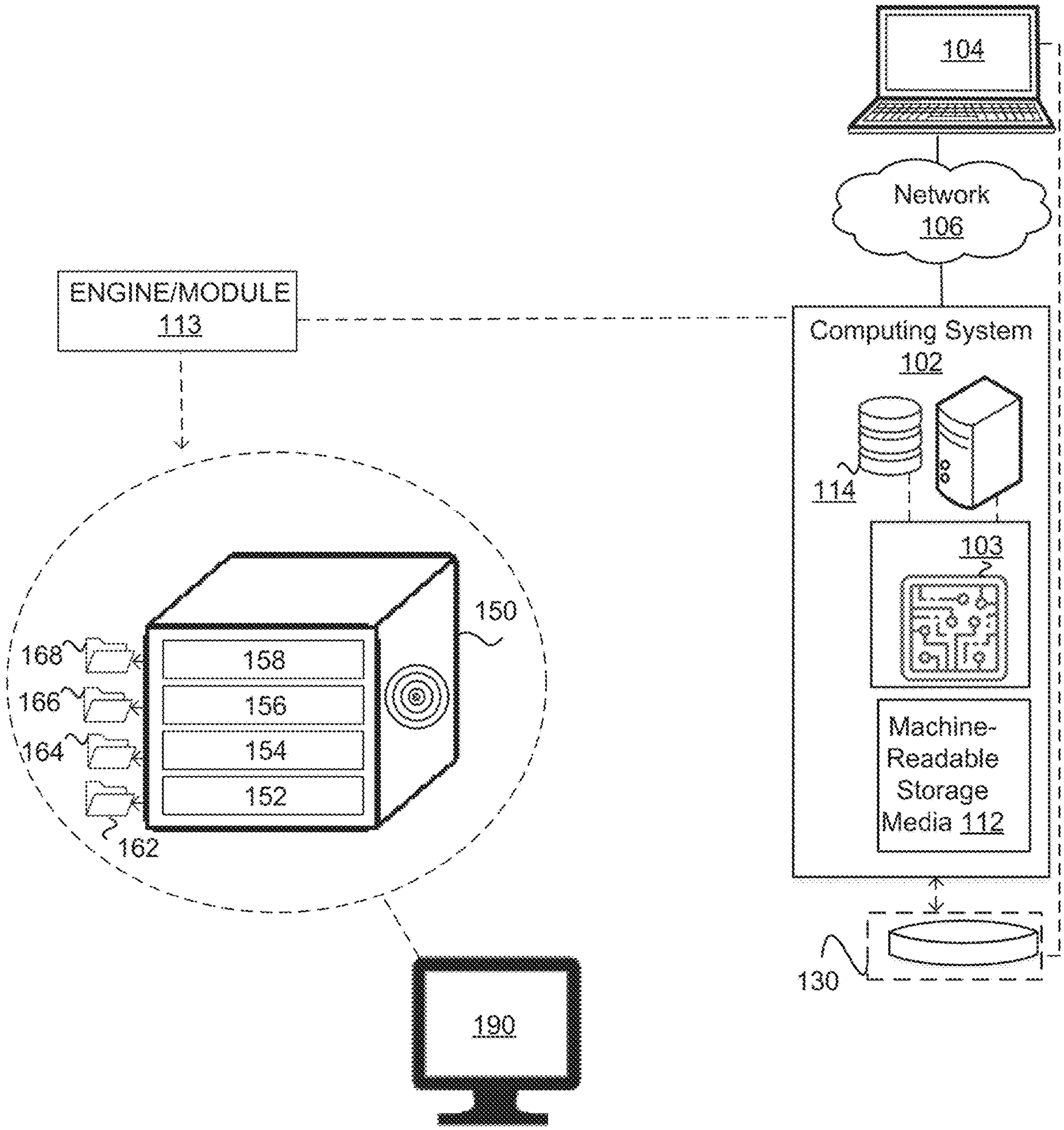
FIG. 1 illustrates an example implementation, in accordance with various examples, of a computing system that performs selective compression of images or templates, verifying that each unique file and/or each unique layer matches the original file and/or original layer, and simulating a reconstruction of the original images using the archive. The images each represent a schema of a container, and are used to generate an instance of a container.

In some current implementations, specific portions of an application to be deployed and/or tested may be stored, organized, or packaged within a construct or infrastructure such as a container. The container may be stored within a virtual space inside a host machine, such as a server or computer. The container may be further divided into segments, divisions, portions or compartments, such as layers. Each layer may further be divided into subdivisions or sublayers, such as individual files. In some examples, a base layer within the container may include a kernel of an operating system. In other examples, the container may be installed on top of an operating system of the host machine, and the container may call a functionality of the operating system of the host machine. The layers may further include, for example, logic, tools (e.g., databases), libraries, and/or dependencies. One example of a dependency is a reference to an external file, such as an external JAR file. The layers may encompass GNU zip (gzip) archives. In some examples, each layer represents only an incremental change or addition from a most recent previous layer, so that each layer builds upon a previous layer rather than existing independently.

A template of the container may include an image, which represents a schema of the containers. The image may include an executable bundle representing binary data, which encapsulates an application and all resources to run the application, including the aforementioned tools, libraries, and/or dependencies. The image may be immutable. The executable bundle, upon execution, generates an instance of the container.

An increasing prevalence and size of images has caused a bottleneck in processing (e.g., scanning) and transport of images. Therefore, in order to expedite and/or reduce computing load in processing and transport of images, a computing system selectively compresses the images by generating an archive that removes repeated copies of layers and/or files. Even if a layer and/or a file is repeated across different images, and/or different computing clusters or nodes, only a single instance or copy of that layer and/or file is stored within the archive. Nodes may refer to physical and/or virtual computing entities such as cloud entities, client devices (e.g., smart device such as laptop, mobile phone, tablet, desktop computer, smart appliance or general edge-computing device). The computing system may verify a veracity of each file stored within the archive based on a checksum of that file. The checksum may be calculated with or without a cryptographically secure snapshot of that file. Furthermore, the computing system may further create and/or store metadata within the archive. The metadata may include protocol on how to reconstruct the layers using the archive. The computing system may simulate a reconstruction of the layers using the archive and the metadata to verify that the layers are reconstructable. If the simulated reconstruction is successful (e.g., matches the original layers in the container), the archive may be transmitted to a different network, such as an air-gapped network, secure network, or sandboxed environment. If the simulated reconstruction is unsuccessful (e.g., fails to match the original layers in the container byte-for-byte), the computing system may delete the archive. The original layers may be transmitted to the different network without being compressed, in that scenario. In the different network, an image and/or a container may be generated from the archive. The container may be used to deploy and/or run one or more applications within the different network. In such a manner, selectively compressing the images would not compromise a reconstruction of the images, or otherwise compromise or hamper a deployment of a container.

FIG. 1 illustrates an example implementation, in accordance with various examples, of a computing system 102 that performs selective compression of images or templates (hereinafter "images") by generating an archive that includes only a single copy of each unique file and/or each unique layer within the images and skipping any repeated instances of files and/or layers, verifying that each unique file and/or each unique layer matches the original file and/or original layer, and simulating a reconstruction of the original images using the archive. This process will be elucidated in more detail in the subsequent FIGS. 2A, 2B, 2C, 3, 4A, 4B, 5A, 5B, and 5C.

The computing system 102 is integrated with a database 130. A computing device 104 may be operated by an entity such as a user. The user may submit a request or query through the computing device 104. Such a request or query may relate to operations on or pertaining to the images or templates, which may include read and/or write operations, processing, storing, analysis, alerting, and/or other operations. In some examples, the computing device 104 may visually render any outputs generated from the operations. In general, the user can interact with the computing system 102 and/or the database 130 directly or over a network 106, for example, through one or more graphical user interfaces, application programming interfaces (APIs), and/or webhooks. The computing device 104 may include one or more processors and memory.

The computing system 102 may include one or more processors 103 (e.g., hardware and/or virtual processors) which may be configured to perform various operations by interpreting machine-readable instructions, for example, from a machine-readable storage media 112. In some examples, one or more of the processors 103 may be combined or integrated into a single processor, and some or all functions performed by one or more of the processors 103 may not be spatially separated, but instead may be performed by a common processor. The processors 103 may further be connected to, include, or be embedded with one or more engines or modules 113 (hereinafter "engine 113") which, for example, may include protocol that is executed to carry out the functions of the processors 103. In general, the engine 113 may be implemented, in whole or in part, as software and/or firmware that is capable of running on the computing system 102, and may be read or executed from the machine-readable storage media 112. The engine 113 may include, as nonlimiting examples, parameters, expressions, functions, arguments, evaluations, conditions, and/or code. The engine 113 may include portions that are manually written, composed using a graphical user interface, or automatically generated. Here, in some examples, the engine 113 encompasses functions of or related to compression of images or templates (hereinafter "images") by generating an archive that includes only a single copy of each unique file and/or each unique layer within the images and skipping any repeated instances of files and/or layers, verifying that each unique file and/or each unique layer matches the original file and/or original layer, and simulating a reconstruction of the original images using the archive, or coordinating, controlling, orchestrating, or managing such functions. Functions or operations described with respect to the engine 113 may be associated with a single processor or multiple processors. Functions or operations within the engine 113 will be subsequently described, following a description of the database 130.

The database 130 may include, or be capable of obtaining, receiving, or retrieving, information regarding the images, including versions of the images, constituents of the images (e.g., layers and/or images), compressed versions of the images and/or layers such as generated archives, times or timestamps associated with the versions of the images, and/or compressed versions of the images and/or layers. The database 130 may further include, any instances of containers generated from the images, and deployments of the containers, such as deployment attributes, characteristics, and/or properties, such as logs of updates and/or rollbacks and respective times or timestamps thereof, including any issues or bugs detected in the containers, and/or in the images, layers, or files. The information may be stored in any format, such as an object oriented format, a relational format, or a tabular format. The information may also be manifested as unstructured data or structured data. The information may include qualitative, quantitative, and/or Boolean values or entries. In some examples, the information may have been originally in one or more different formats and converted or normalized or standardized into one or more uniform formats or syntaxes within the database 130. In some examples, the database 130 may include metadata, for example, which may include any paths (e.g., host paths or directory paths) and/or security or access control attributes of the images, layers or files.

The computing system 102 may also include a storage 114, which may include a cache for faster access compared to the database 130. The storage 114 may include any or all information stored within the database 130, and/or additional information from sources besides the database 130.

An image 150 may include further segments or divisions such as layers 152, 154, 156, and/or 158. Although four layers are shown for the sake of illustration, the image 150 may include any number of layers. Each layer may be further divided into subdivisions such as filesets. The layer 152 may include a base layer shared among different images. The layers 152, 154, 156, and 158 may include filesets 162, 164, 166, and 168, respectively. In some examples, the layer 152 may include an operating system kernel layer while the layers 154, 156, and 158 may encompass any of application, logic, database, libraries, and/or dependencies. The image 150 may be stored or housed within a virtual space in a host 190, which may be a node, server, or computer.

Figure 2A:
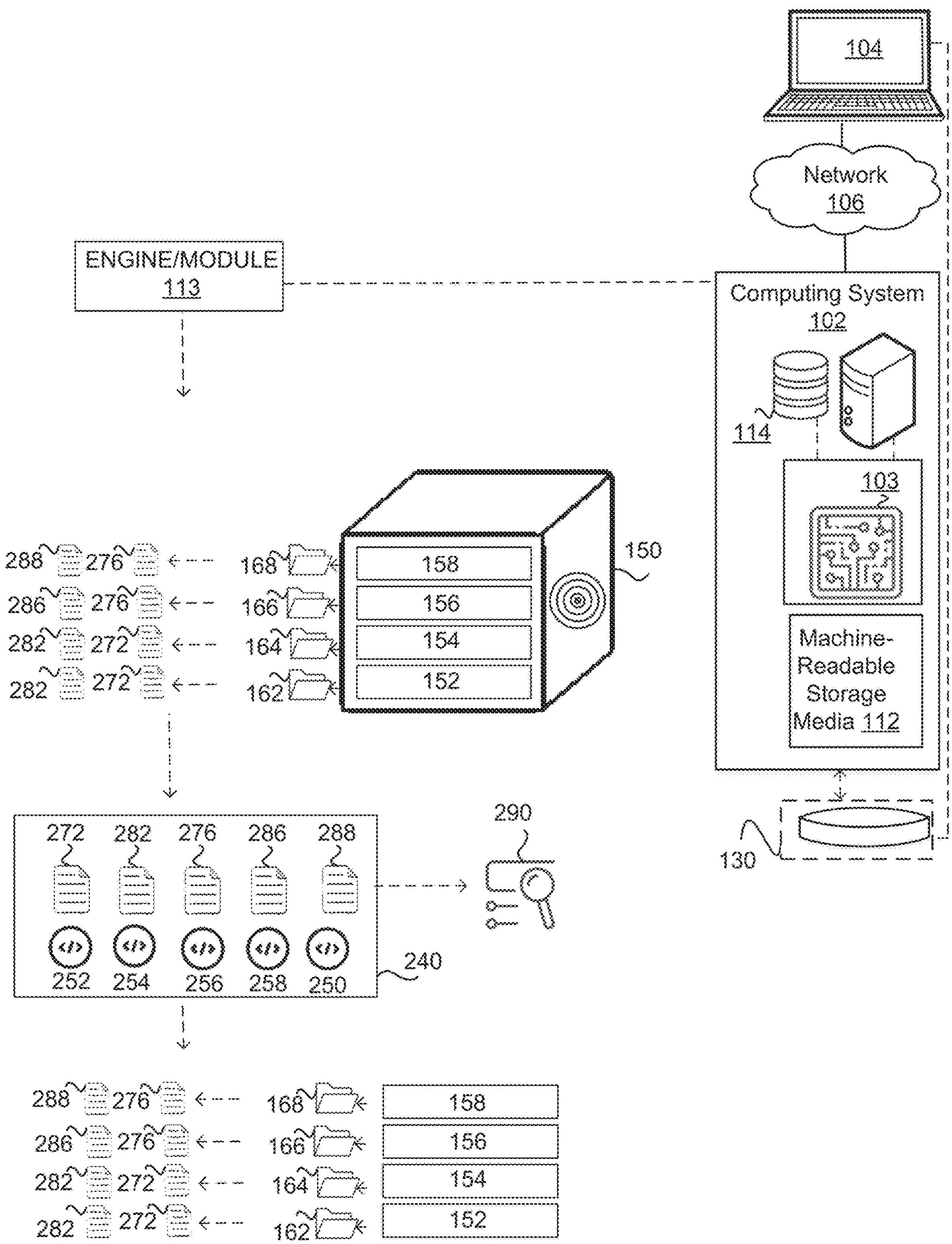
FIGS. 2A-2C illustrate example implementations, in accordance with various examples, of a computing system that verifies an archive of a compressed version of the images.

As illustrated in FIG. 2A, the fileset 162 includes files 272 and 282. The fileset 164 includes the files 272 and 282. The fileset 166 includes files 276 and 286. The fileset 168 includes the files 276 and 288. The files 272, 282, 276, and 286 and/or the layers 152, 154, 156, and 158 may each include a header, a footer, and a payload. Each fileset may include any number of files, and two files are shown for each fileset merely for the sake of illustration. The engine 113 may detect that the file 272 is repeated across the layers 152 and 154, as is the file 282. In addition, the engine 113 may detect that the file 276 is repeated across the layers 156 and 158. Therefore, the engine 113 may copy or transmit the files 272, 282, 276, 286, and 288 into an archive 240, while removing, or refraining from copying, the repeated files 272, 282, and 276. In other words, even though the files 272, 282, and 276 appear in numerous instances within the image 150, the engine 113 only copies a single instance into the archive 240. The engine 113 may continue to copy or transmit files into the archive 240 until a space occupied by the files reaches a threshold, such as, for example, 5 Gigabytes (GB). Upon reaching the threshold, the engine 113 may copy or transmit files into a different archive. The engine 113 may check or confirm whether the files within the archive 240 match the originally stored files (e.g., 272, 282, 276, 286, and 288) within the image 150, based on a checksum of each of the files within the archive 240. For example, the engine 113 may verify that the file 272 stored within the archive 240 matches, byte-for-byte, the file 272 stored within the image 150, and perform an analogous operation with respect to the files 282, 276, 286, and 288. If the files within the archive 240 match the originally stored files in the image 150 byte-for-byte, then the engine 113 may store metadata, within the archive 240, that includes information on reconstructing the image 150 and each of the layers 152, 154, 156, and 158 within the image 150 from the archive 240. In response to a byte-for-byte match, the engine 113 may proceed to simulate reconstructing the image 150 and/or perform scanning. Otherwise, in an absence of a byte-for-byte match, the engine 113 may attempt to generate an archive again one or more times, or alternatively, refrain from generating an archive again.

The metadata encompasses metadata 252, 254, 256, and 258 corresponding to the layers 152, 154, 156, and 158, and metadata 250 corresponding to the image 150. The metadata 252, 254, 256, and 258 may include any files within each of the respective layers 152, 154, 156, and 158, any directory or host paths of the files, security and access control attributes of the files. The metadata 250 may include any layers within the image 150, and indicate any relationships between the layers. For example, the metadata 250 may indicate that the layer 154 is built off the layer 152 and indicates a difference, change, or addition with respect to the layer 152, that the layer 156 is built off the layer 154, and that the layer 158 is built off the layer 156. Thus, the metadata 252, 254, 256, and 258 is used to reconstruct the respective layers 152, 154, 156, and 158, while the metadata 250 is used to reconstruct the image 150. However, if any of the files within the archive 240 fail to match the originally stored files in the image 150 byte-for-byte, the engine 113 may remove or delete the archive 240 and attempt, one or more times, the compression of the image 150 to generate an archive again and confirm, again, whether the generated archive matches the originally stored files. In some examples, the engine 113 may selectively generate an archive again based on an extent or degree of difference between any or all of the originally stored files and the individual files within the archive 240. If the extent of difference exceeds a threshold difference, the engine 113 may refrain from generating an archive again. Otherwise, the engine 113 may generate an archive again.

The engine 113 may also perform a scan of the archive 240 using a scanner service 290. The scan may confirm an absence of bugs, or any other issues that may potentially compromise security of any of the files 272, 282, 276, 286, and 288. Thus, because the archive 240 is a compressed version of the image 150, a scan of the archive 240 would consume less time and computing resources compared to a scan of the image 150. The engine 113 may further simulate a reconstruction of the image 150 and of the layers 152, 154, 156, and 158 using the archive 240, which includes the files 272, 282, 276, 286, and 288, and the metadata 252, 254, 256, 258, and 250. The engine may determine or verify whether the simulated reconstruction of the image 150 matches the image 150 byte-for-byte. The scan may occur following the verification or determination of whether the reconstructed image matches the image 150, before the verification, or in parallel with the verification. In FIG. 2A, a reconstruction of the image 150 has been determined to match the image 150 byte-for-byte, and the scanning service 290 has revealed no bugs or other security issues. The engine 113 may store the archive 240 within the storage 114 and/or the database 130. The archive 240 may be transmitted into a different network for deployment and/or processing. However, if either the reconstruction of the image 150 fails to match the image 150, or the scanning service 290 reveals bugs or security issues, then the engine 113 may delete the archive 240.

Figure 2B:
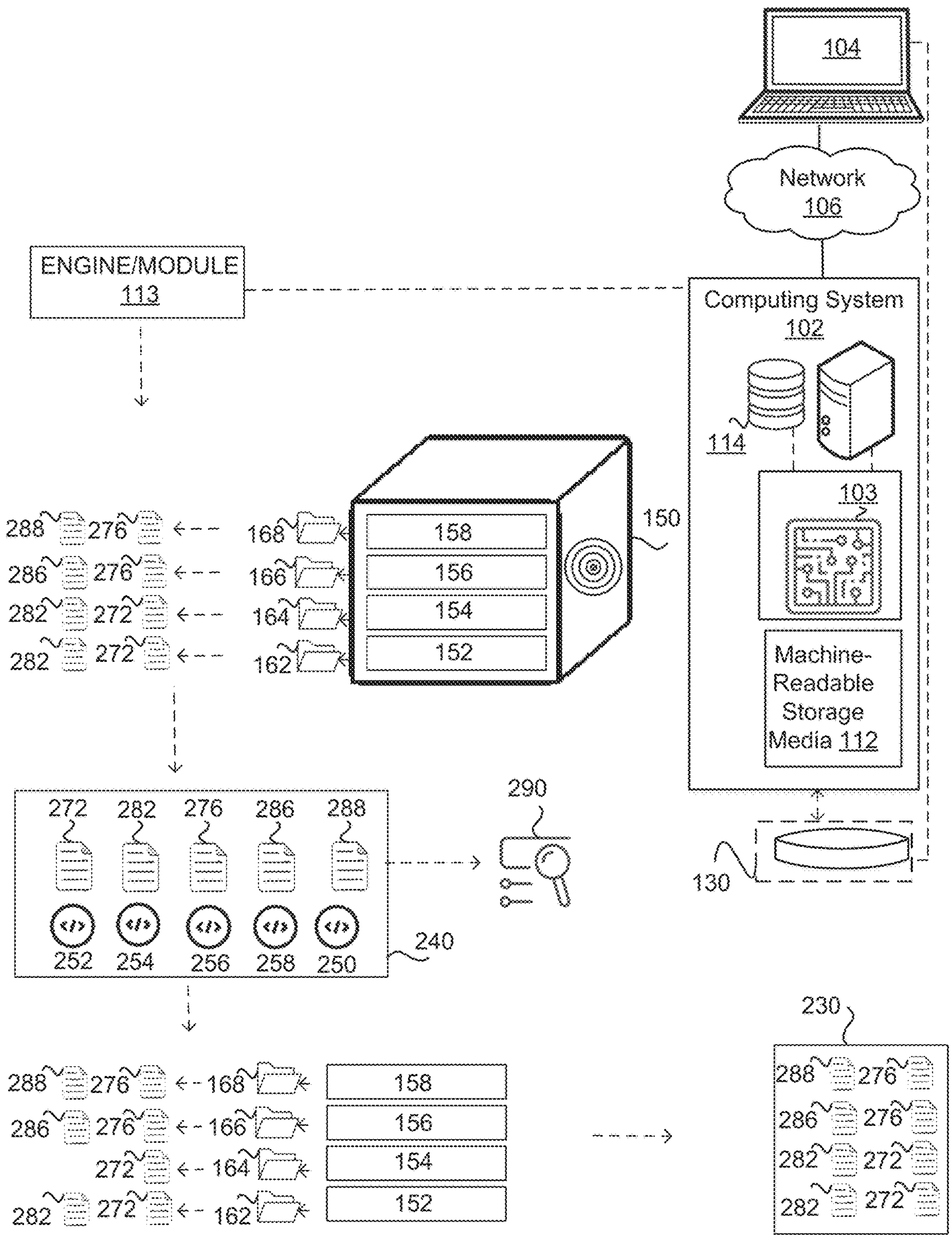

In FIG. 2B, the engine 113 may determine that a reconstruction of the image was unsuccessful, and/or failed to match the image 150. Checksums may not match between the reconstructed image and the image 150. Such a failure may occur due to erroneous metadata and/or processing of the metadata, for example, a failure to read null bytes within any portions of any of the files 272, 282, 276, 286, and 288. The engine 113 may delete the archive 240. For example, the engine 113 may determine that the attempted reconstruction failed to include the file 282 within the layer 154. Such an error may be logged, by the engine 113, into the storage 114 and/or the database 130. The engine 113 may attempt to reconstruct the image again, or specifically the impacted layer (e.g., the layer 154), and/or create a new archive, to resolve potentially erroneous metadata. The engine 113 may attempt to reconstruct and/or create a new archive a given number of times. In some examples, the engine may selectively attempt to reconstruct the image again and/or create a new archive a given number of times based on an extent or degree of a deviation between the attempted reconstruction and the image 150. The extent of the deviation may depend on any of a number or proportion of files missing or erroneous within the attempted reconstruction and/or an extent to which the attempted reconstruction deviates from the image 150. In some examples, with or without reattempting to reconstruct the file or to create a new archive, the engine 113 may package the layers 152, 154, 156, and 158 without compressing, within a package 230. The package 230, rather than the archive 240, may be transmitted to a different network. Therefore, the engine 113 minimizes any possibility of erroneous transmission of files, layers, or images, while still reducing a deployment and processing time and conserving computing resources dedicated to such.

Figure 2C:
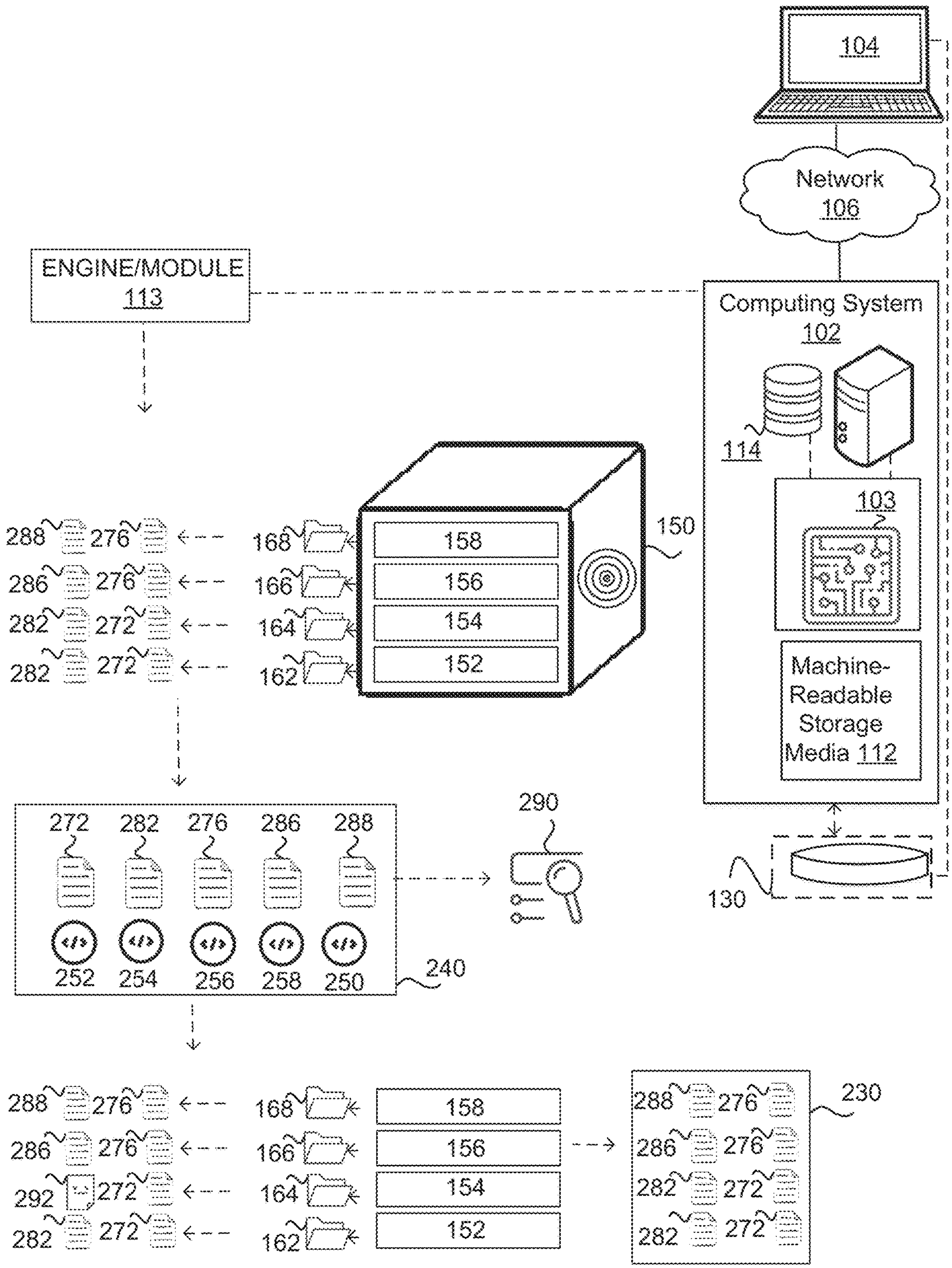

FIG. 2C illustrates another scenario in which the engine 113 determines that a reconstruction of the image was unsuccessful, and/or failed to match the image 150. In particular, the engine 113 may determine a corrupted file 292 within the layer 154, instead of the file 282. Checksums may not match between the reconstructed image and the image 150. The engine 113 may then perform same or similar operations as that described above with respect to FIG. 2B.

Figure 3:
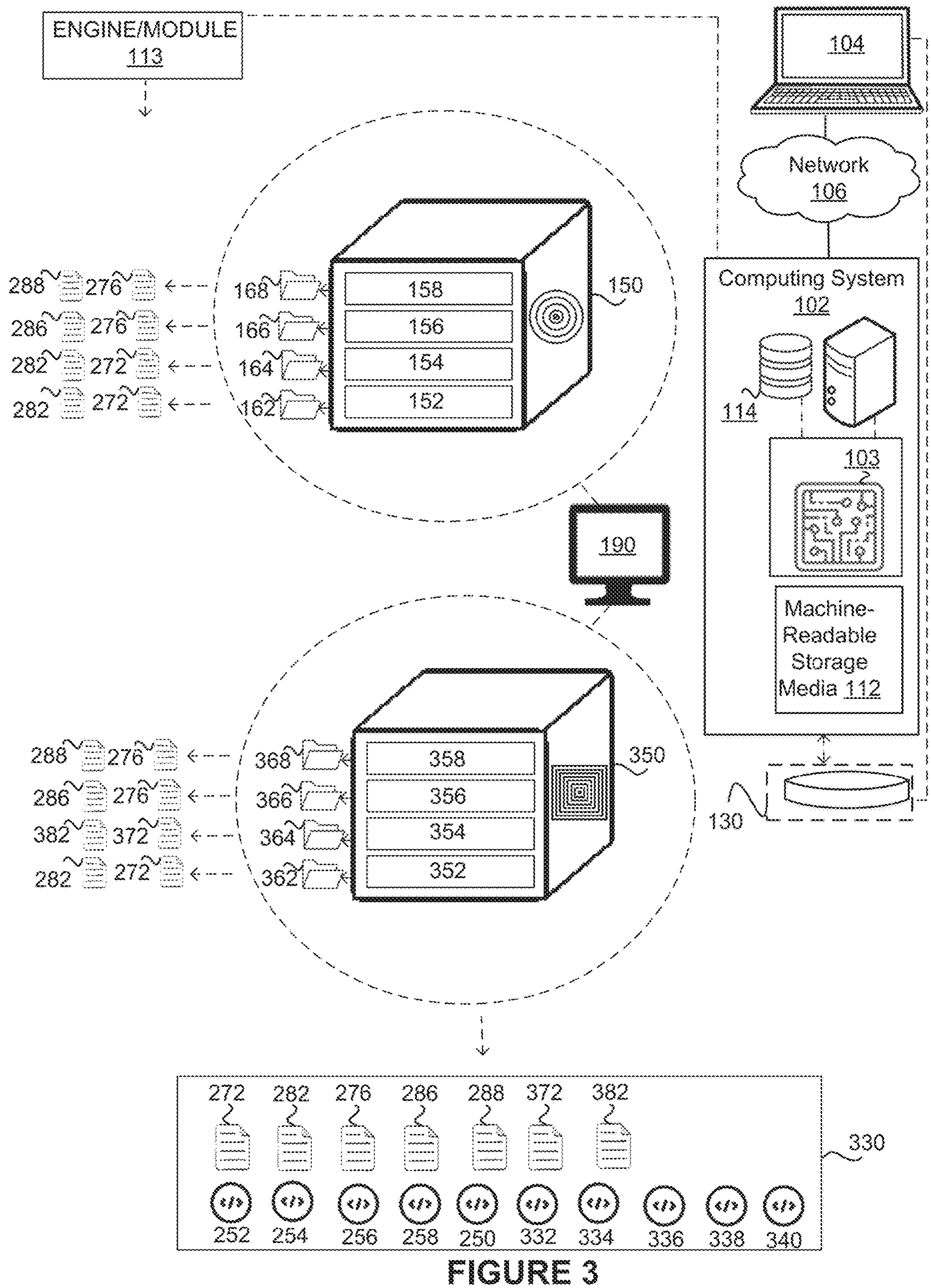
FIG. 3 illustrates an example implementation, in accordance with various examples, of a computing system that performs selective compression of images or templates from a same computing cluster or node.

FIG. 3 illustrates that the engine 113 may perform operations of generating a compressed version of the images or templates across different images, including the image 150 and an image 350. In FIG. 3, the images 150 and 350 may reside on a common host, the host 190. The image 350 may include layers 352, 354, 356, and 358, which may include filesets 362, 364, 366, and 368, respectively. In some examples, the fileset 362 includes the files 272 and 282. The fileset 264 includes files 372 and 382. The fileset 366 includes files 276 and 286. The fileset 368 includes the files 276 and 288. Each fileset may include any number of files, and two files are shown for each fileset merely for the sake of illustration. The engine 113 may detect that the files and 282 are repeated across the layers 152, 154, and 352, the file 276 is repeated across the layers 156, 158, 356, and 358, the file 286 is repeated across the layers 156 and 356, and that the file 288 is repeated across the layers 158 and 358. The engine 113 may determine that the files 372 and 382 are included in the image 350 but not in the image 150. Thus, the engine 113 may generate an archive 330 that includes only a single copy of the files 272, 282, 276, 286, and 288 that were previously in the archive 240 in addition to the files 372 and 382, and the metadata 252, 254, 256, 258, and 250, in addition to metadata 332, 334, 336, 338, and 340. The metadata 332, 334, 336, and 338 may include any files within each of the respective layers 352, 354, 356, and 358, any directory or host paths of the files, security and access control attributes of the files. The metadata 340 may include any layers within the image 350, and indicate any relationships between the layers. For example, the metadata 350 may indicate that the layer 354 is built off the layer 352 and indicates a difference, change, or addition with respect to the layer 352, that the layer 356 is built off the layer 354, and that the layer 358 is built off the layer 356. Thus, the metadata 332, 334, 336, and 338 is used to reconstruct the respective layers 352, 354, 356, and 358, while the metadata 340 is used to reconstruct the image 350 separately from the image 150. Other operations, such as scanning and verification, may be implemented in a same or similar manner as described with respect to FIGS. 1 and 2A-2C.

Figure 4A:
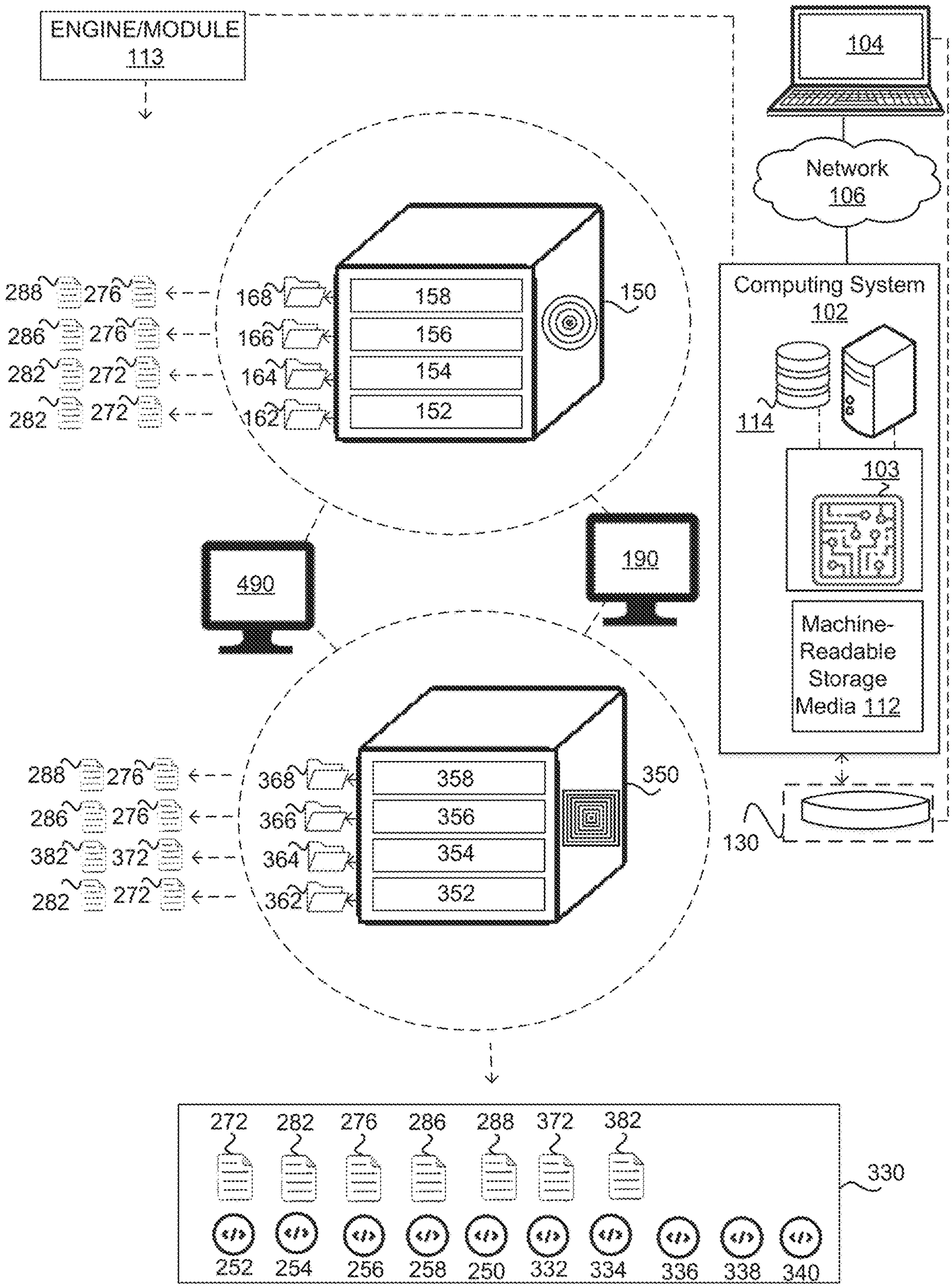
FIGS. 4A-4B illustrate an example implementation, in accordance with various examples, of a computing system that performs selective compression of images or templates from different computing clusters or nodes.
Figure 4B:
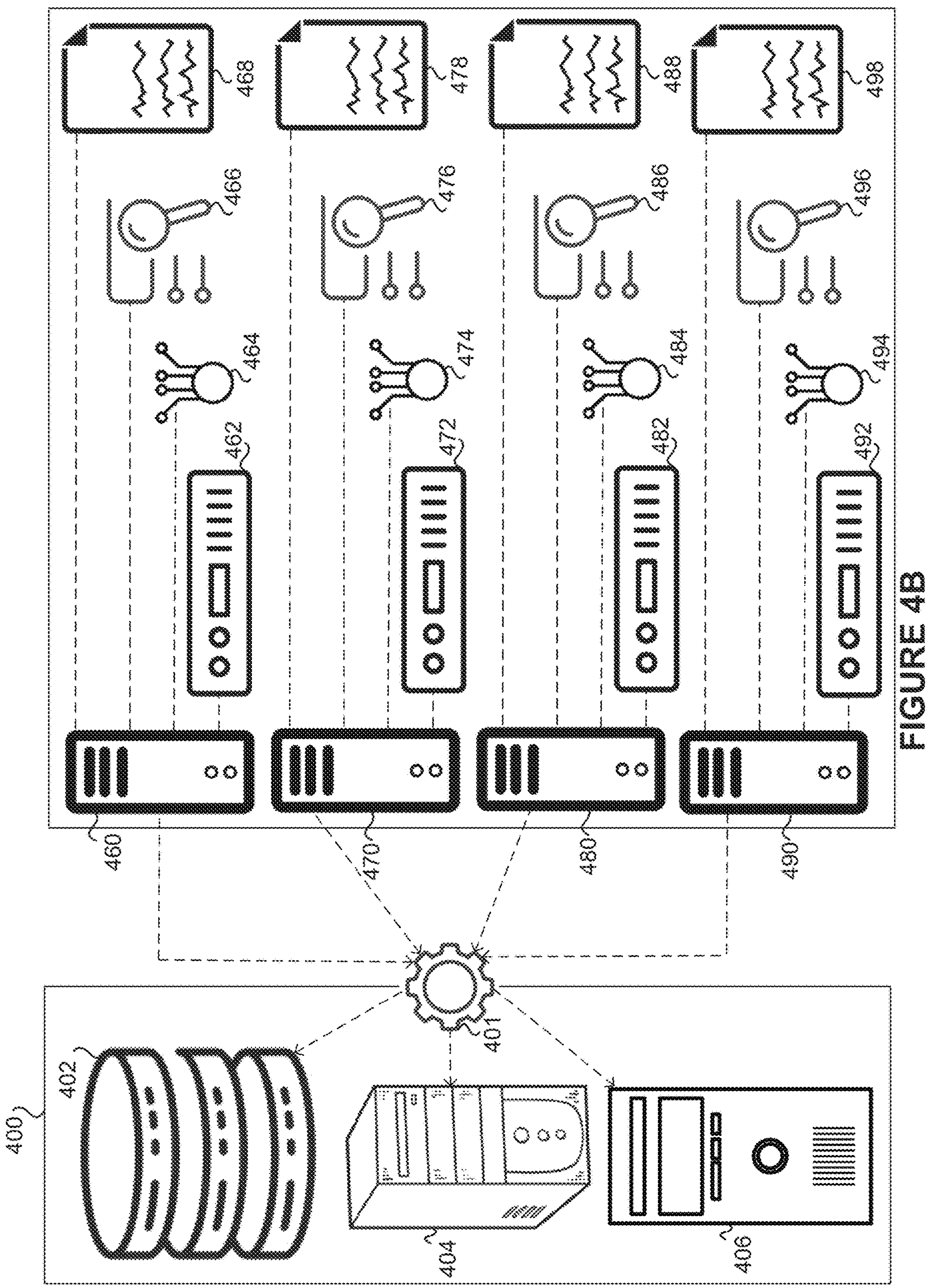

FIGS. 4A-4B illustrate that the engine 113 may perform operations of generating a compressed version of the images or templates across different images, including the image 150 and an image 350. Instead of the images 150 and 350 being on a same host, the images 150 and 350 may be on different hosts, with the image 150 being stored within the host 190 and the image 350 being stored within a host 490. In some examples, the host 190 and 490 may be nodes as part of different computing clusters. The hosts 190 and 490 may each be virtual, physical, or cloud-based. In some examples, each of the different computing clusters separately stores data, manages network connectivity and network permissions, provides an API server such as a Representational state transfer (REST) interface, and/or schedules and controls processes. Regardless of whether the images 150 and 350 are stored or implemented within a common host or a different host, and whether the different host is within a common computing cluster or a different computing cluster, the engine may perform compression of files across all the images, 150 and 350, in a same or similar manner as described in FIG. 3.

Figure 5A:
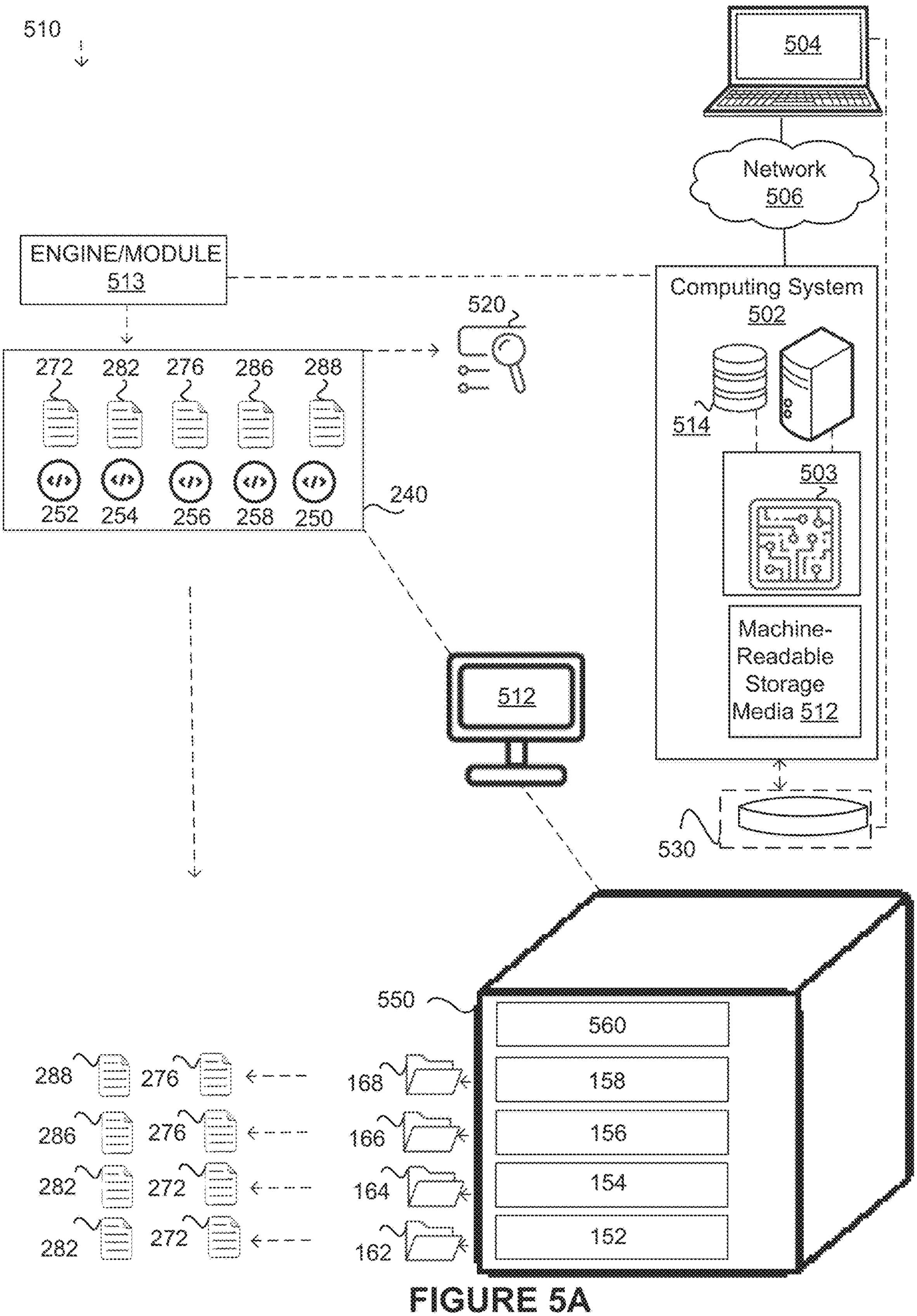
FIGS. 5A-5C illustrate example implementations, in accordance with various examples, of a computing system that reconstructs a container based on images or templates. The computing system in FIGS. 5A-5C may be in an air-gapped or secured computing environment.

FIG. 5A describes an implementation of a separate computing system 502 within a secured computing environment 510, such as an air-gapped network or a sandboxed environment, after receiving the archive 240 which was created by the engine 113 within the computing system 102, as illustrated and described in FIGS. 1 and 2A-2C. The separate computing system 502 may be otherwise implemented in a same or similar manner as the computing system 102, besides being in a different network which may be a secured environment.

The computing system 502 is integrated with a database 530. A computing device 504 may be operated by an entity such as a user. The user may submit a request or query through the computing device 504. Such a request or query may relate to operations on or pertaining to the archive 240, which may include read and/or write operations, processing, storing, analysis, alerting, and/or other operations. In some examples, the computing device 504 may visually render any outputs generated from the operations. In general, the user can interact with the computing system 502 and/or the database 530 directly or over a network 506, for example, through one or more graphical user interfaces, application programming interfaces (APIs), and/or webhooks. The computing device 504 may include one or more processors and memory.

The computing system 502 may include one or more processors 503 (e.g., hardware and/or virtual processors) which may be configured to perform various operations by interpreting machine-readable instructions, for example, from a machine-readable storage media 512. In some examples, one or more of the processors 503 may be combined or integrated into a single processor, and some or all functions performed by one or more of the processors 503 may not be spatially separated, but instead may be performed by a common processor. The processors 503 may further be connected to, include, or be embedded with one or more engines or modules 513 (hereinafter "engine 513") which, for example, may include protocol that is executed to carry out the functions of the processors 503. In general, the engine 513 may be implemented, in whole or in part, as software and/or firmware that is capable of running on the computing system 502, and may be read or executed from the machine-readable storage media 512. The engine 513 may include, as nonlimiting examples, parameters, expressions, functions, arguments, evaluations, conditions, and/or code. The engine 513 may include portions that are manually written, composed using a graphical user interface, or automatically generated. Here, in some examples, the engine 513 encompasses functions of or related to processing of the archive 140, reconstructing an image, and/or creating or generating a compartment or container 550 from the archive 140 or the image. The container 550 may include infrastructure for running an application stored within the layers 152, 154, 156, and 158. Functions or operations described with respect to the engine 513 may be associated with a single processor or multiple processors. Functions or operations within the engine 513 will be subsequently described, following a description of the database 530.

The database 530 may include, or be capable of obtaining, receiving, or retrieving, information regarding the archive 240, including times or timestamps associated with the archive 240. The database 530 may further include, any instances of containers generated from the archive 240, and deployments of the containers, such as deployment attributes, characteristics, and/or properties, such as logs of updates and/or rollbacks and respective times or timestamps thereof, including any issues or bugs detected in the containers, and/or in the images, layers, or files. The information may be stored in any format, such as an object oriented format, a relational format, or a tabular format. The information may also be manifested as unstructured data or structured data. The information may include qualitative, quantitative, and/or Boolean values or entries. In some examples, the information may have been originally in one or more different formats and converted or normalized or standardized into one or more uniform formats or syntaxes within the database 530. In some examples, the database 530 may include metadata, for example, which may include any paths (e.g., host paths or directory paths) and/or security or access control attributes of the images, layers or files within the archive 240.

The computing system 502 may also include a storage 514, which may include a cache for faster access compared to the database 530. The storage 514 may include any or all information stored within the database 530, and/or additional information from sources besides the database 530.

The engine 513 may generate the container 550 from the archive 240. The container 550 and/or the archive may be hosted on a host 512 within the secured computing environment 510. The container 550 may include the layers 152, 154, 156, and 158, in addition to a writable layer 560. In particular, the layers 152, 154, 156, and 158 may be immutable. Thus, any changes to any of the layers 152, 154, 156, and 158 may be recorded within the writable layer 560. The container 550 thus may contain applications to be deployed for various downstream purposes, as will be described in FIG. 6. The engine 513 may also perform a scanning operation 520, similar to the scanning operation 290, to verify an absence of viruses or other security vulnerabilities.

Figure 5B:
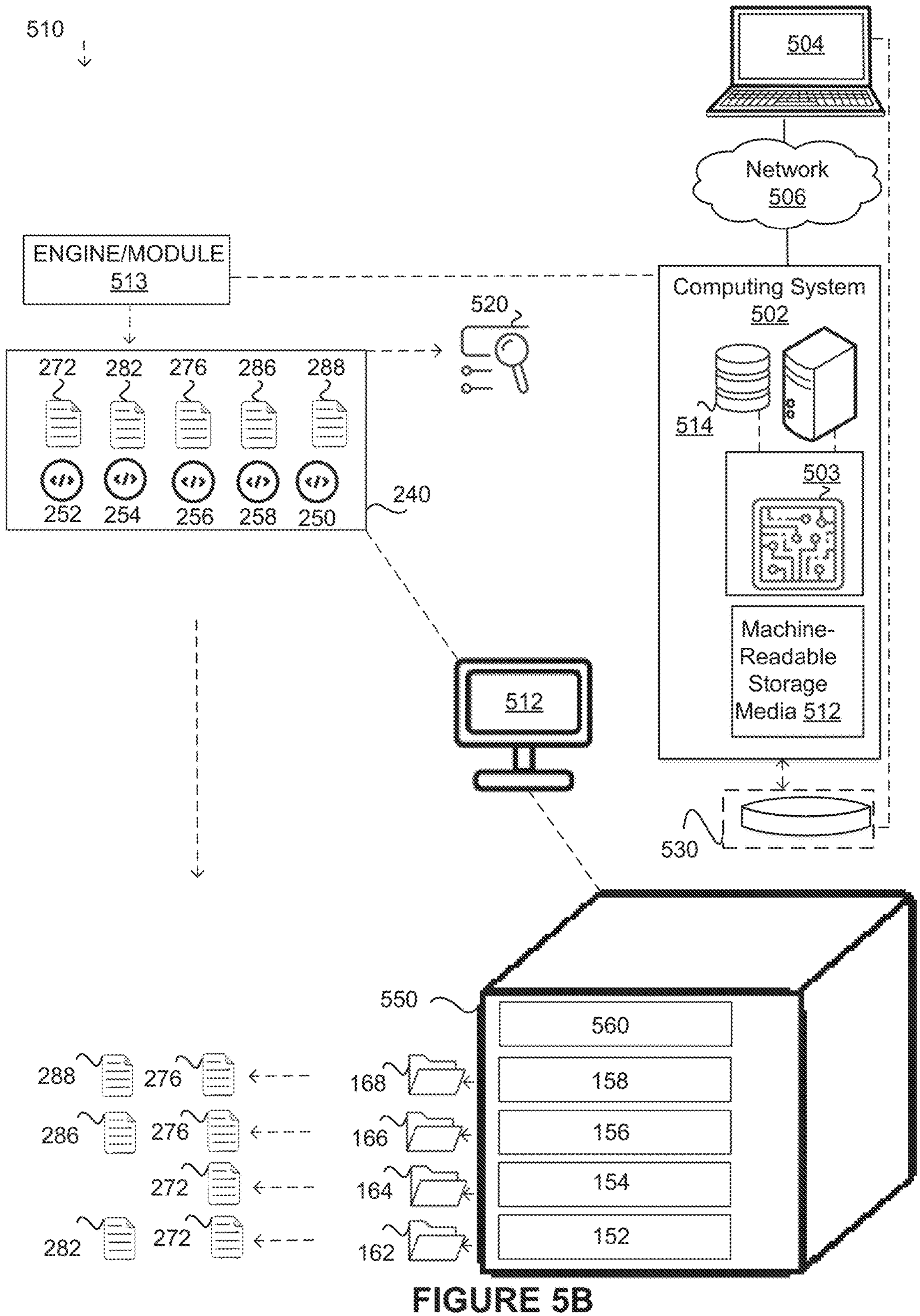
Figure 5C:
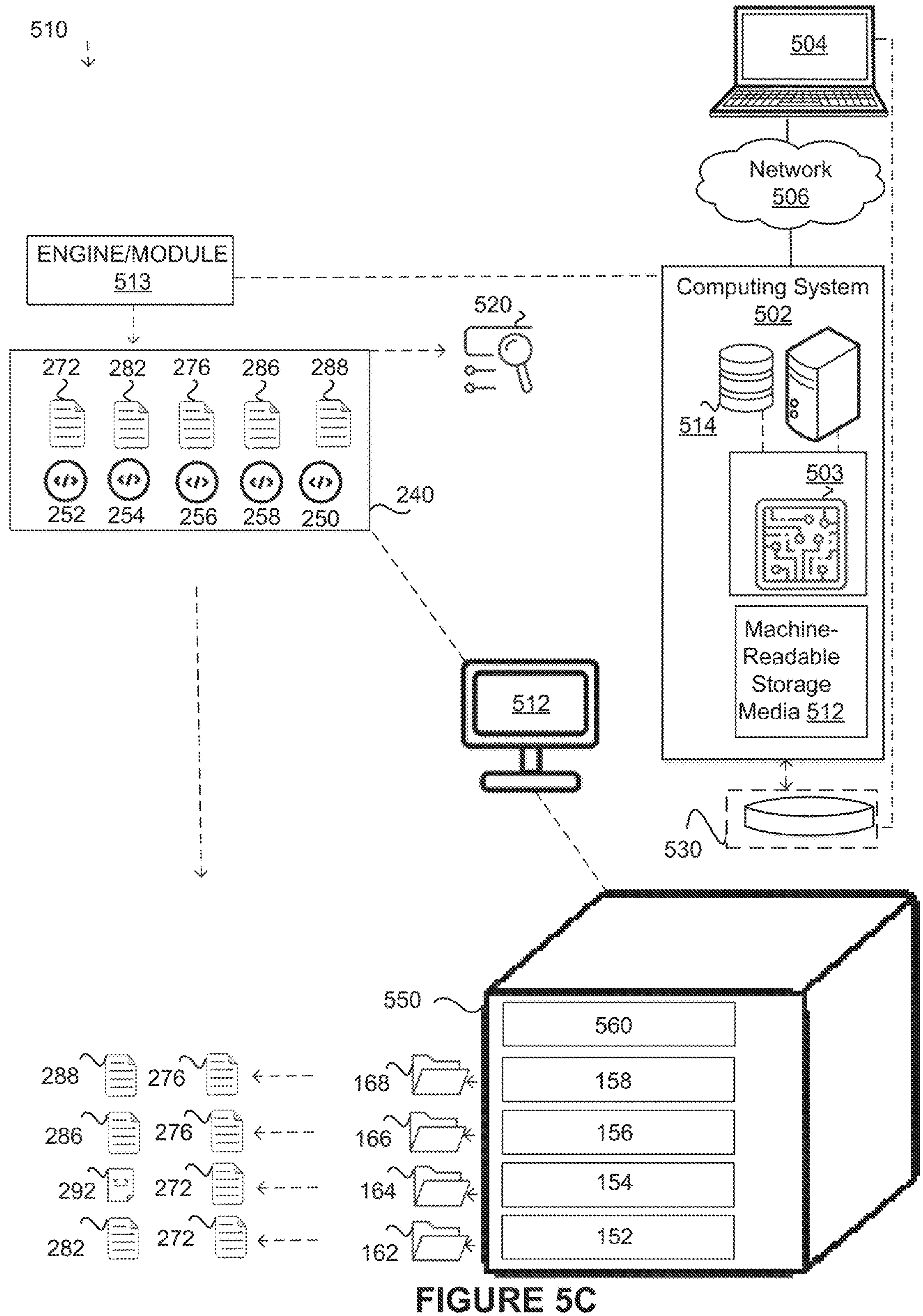

FIGS. 5B and 5C illustrate scenarios in which the container 550 may have one or more layers or files that fail to match corresponding layers or files of the image 150. For example, in FIG. 5B, the file 282 may be missing from the layer 154, and in FIG. 5C, the layer 154 contains the corrupted file 292. Checksums may not match between the container 550 and the image 150. Such scenarios may arise, for example, due to corruption of the archive 240 during transport to the computing system 502. During such a scenario, the engine 113 from the computing system 102 may receive an indication of a mismatch between the checksums and may either create another copy of the archive 240 to be transmitted to the computing system 502, and/or generate a second archive that includes any layers or files for which the checksum of the container 550 and the image 150 fails to match. For example, the second archive may include the layer 154 here. If such measures still result in a discrepancy between checksums of the container 550 and the image 150, the engine 113 may package the image 150 in an uncompressed version, to be transmitted to the computing system 502.

Figure 6:
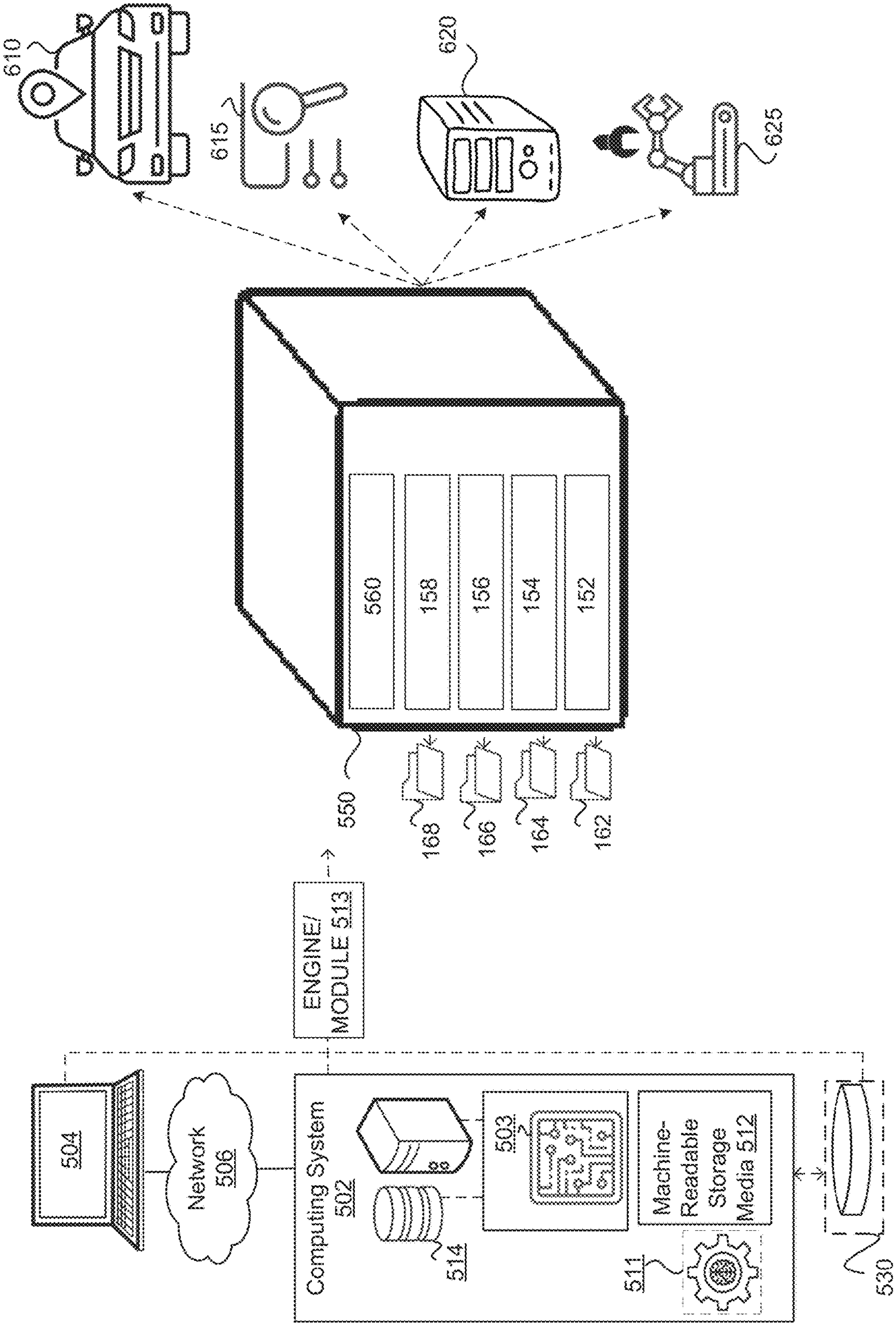
FIG. 6 illustrates an example implementation, in accordance with various examples, of downstream actions following the upgrading of one or more versions of nodes.

FIG. 6 illustrates downstream actions that may be performed, following the engine 613 implementing a deployment of the container 550, in association with any concepts illustrated with respect to any of FIGS. 1, 2A, 2B, 2C, 3, 4A, 4B, 5A, 5B, and 5C. These downstream actions may include collecting additional information, alerting, transmitting or presenting information, calling another application programming interface (API) or webhook, analyzing data, writing data to the database 130 and/or to an external database, and/or performing a transformation or change on underlying data and/or a node associated with the underlying data. FIG. 6 illustrates exemplary downstream actions including performing, controlling, and/or coordinating some physical process such as navigation 610, monitoring 615, transmitting and/or writing information to a different computing system 620, and/or maintenance or other physical operations 1026. The different computing system 1020 may perform modification of data. The modification may encompass creating, editing, or removing entities or links, and/or adjusting attributes or parameters that are falling outside of an operating range or threshold, through some electronic or physical operation.

Figure 7A:
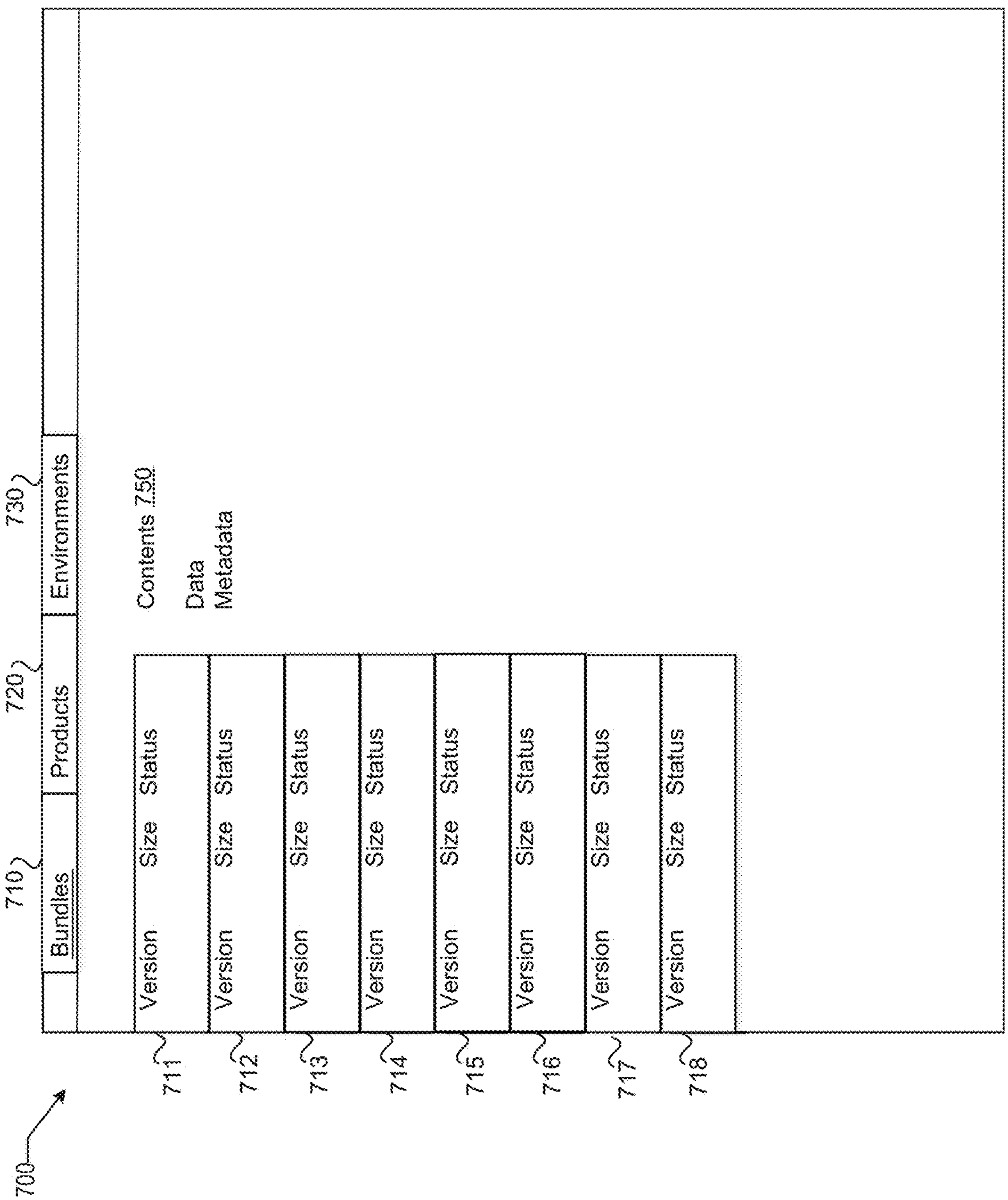
FIGS. 7A, 7B, 7C, and 8 illustrate example user interfaces illustrating details of compression of images or templates.
Figure 7B:
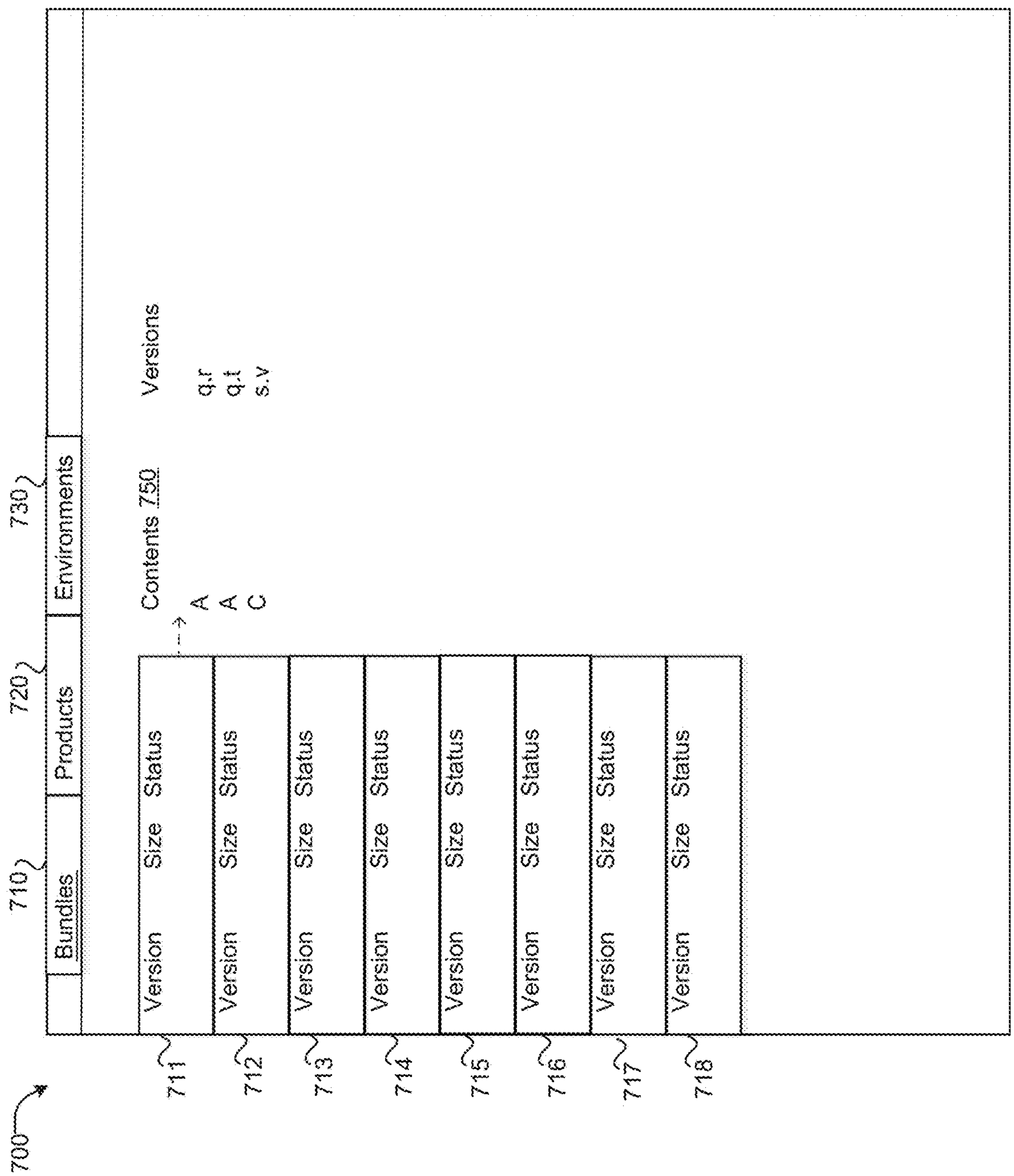
Figure 7C:
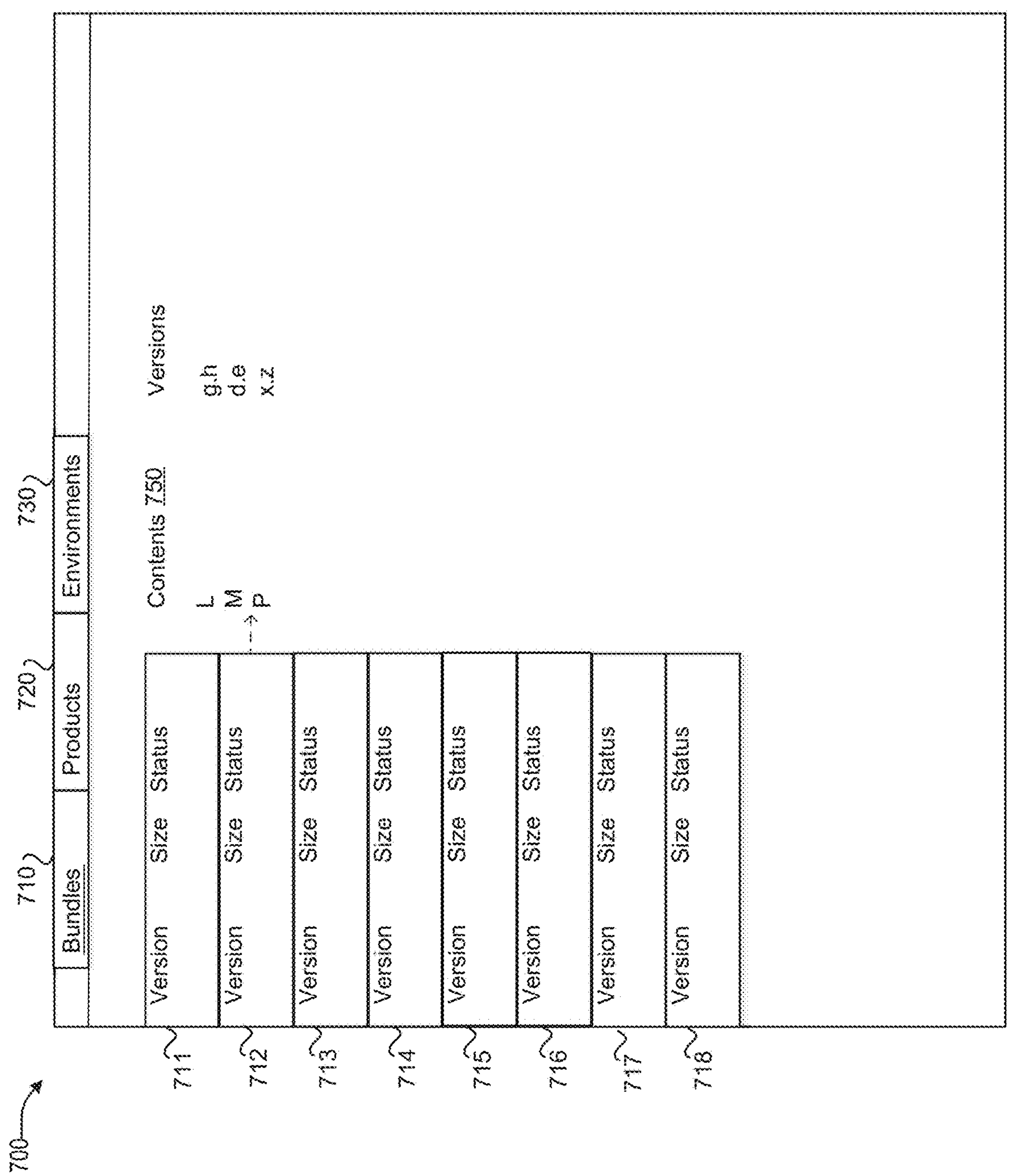
Figure 8:
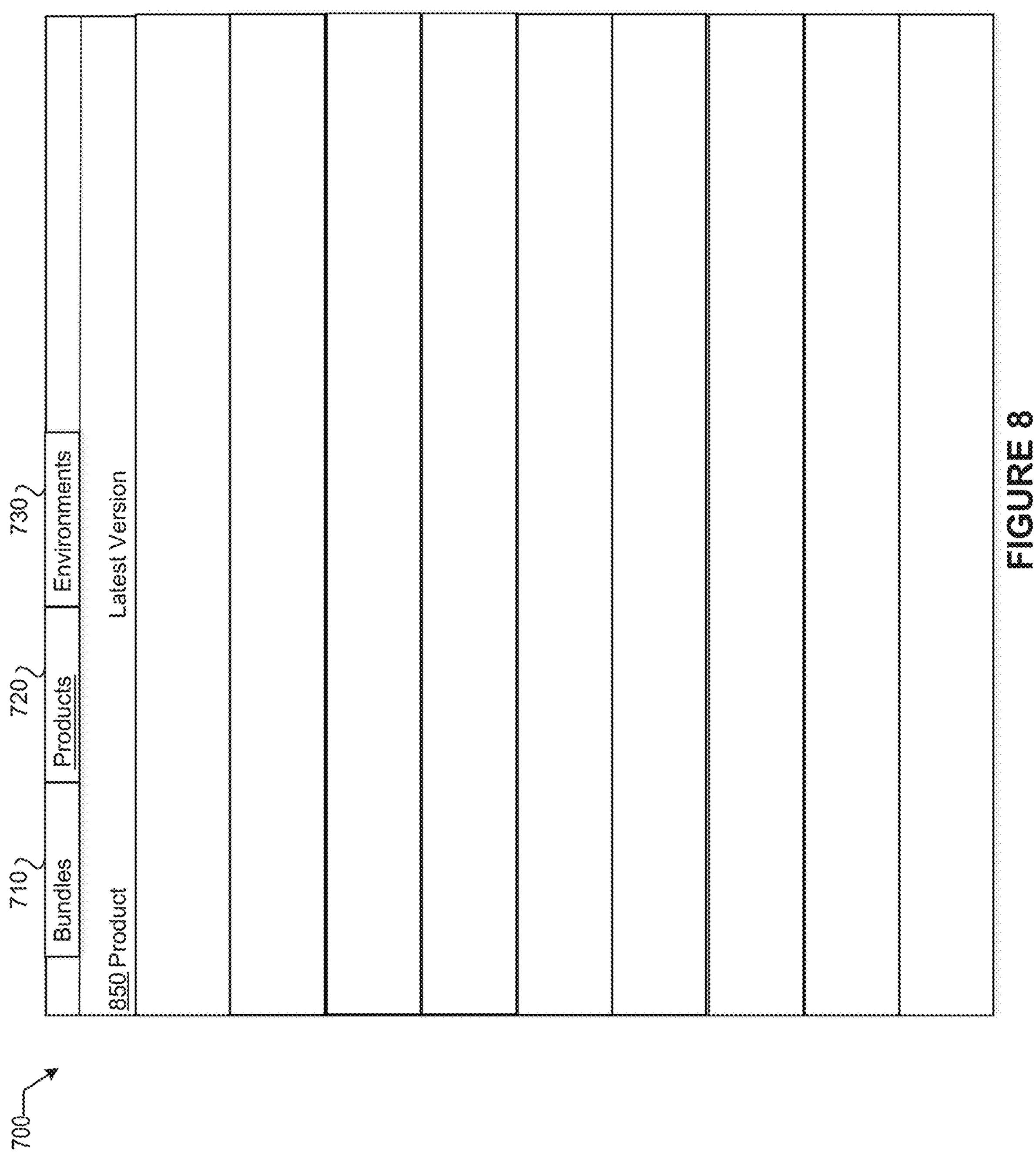

FIGS. 7-8 illustrate exemplary interfaces that illustrate implementations or details of certain aspects of the computing system 102 and/or 502. In FIG. 7, an interface 700 includes tabs 710, 720, and 730 depicting bundles, which may include images, products, which may include individual files or layers, and environments 730, which may include different computing clusters on which the images are deployed. For example, upon selection of the tab 710, information 710-718 including different versions, sizes, and current statuses of images may be populated. Each of the information 710-718 may indicate details of a specific image. Upon selection of any of the information 710-718, contents 750 of a corresponding image may be depicted in a body of the interface 700. The contents 750 may include data and/or metadata of a corresponding image. Meanwhile, in FIG. 8, upon selection of the tab 720, information 850 indicating an individual product (e.g., file) and a latest version of that product may be populated within a body of the interface 700.

Figure 9:
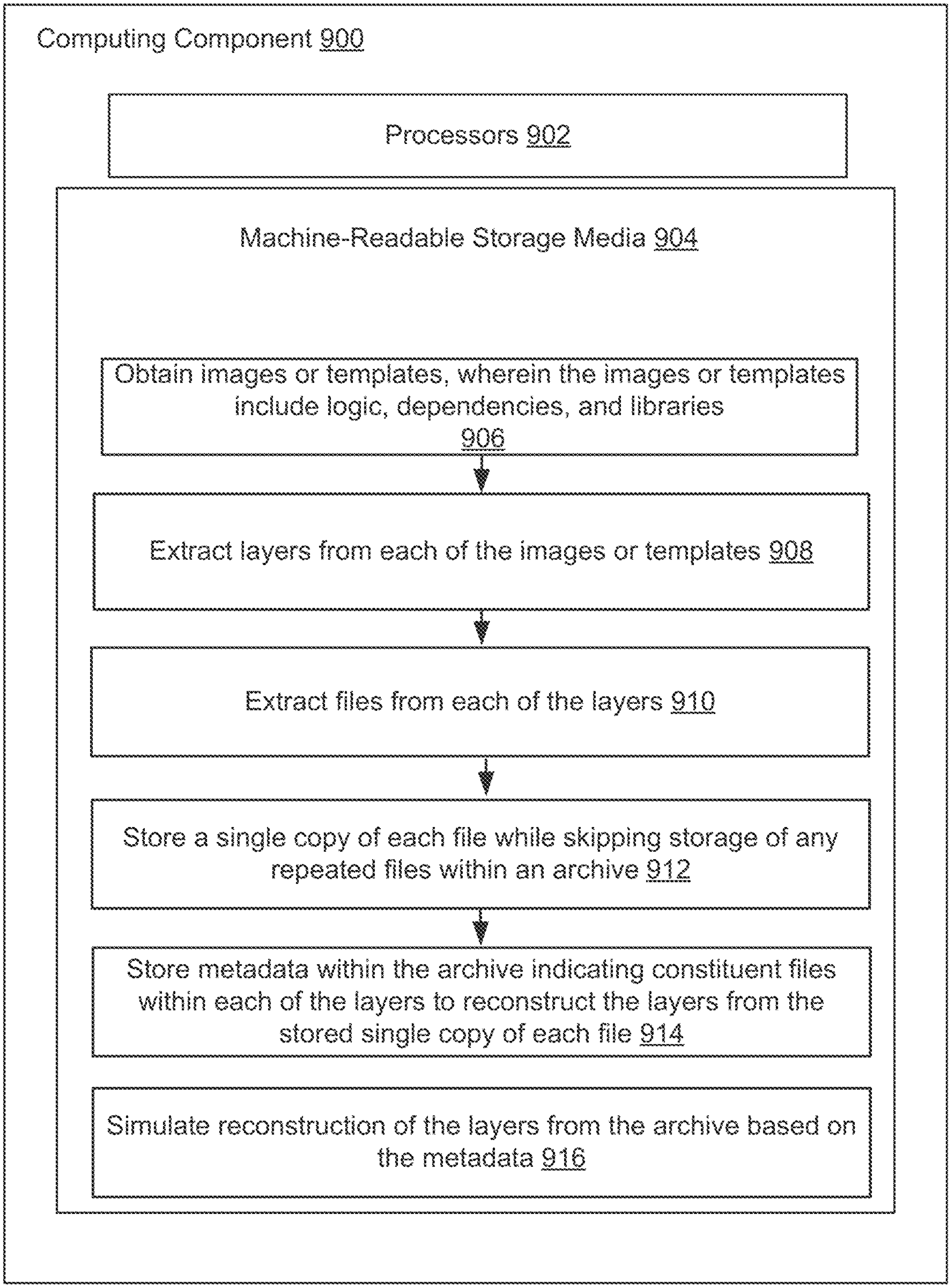
FIG. 9 illustrates a flowchart of an example method consistent with FIGS. 1, 2A, 2B, 2C, 3, 4A, 4B, 5A, 5B, 5C, 6, 7A, 7B, 7C, and 8, embodied in a computing component.

FIG. 9 illustrates a computing component 900 that includes one or more processors 902 and machine-readable storage media 904 storing a set of machine-readable/machine-executable instructions that, when executed, cause the processor(s) 902 to perform an illustrative method of monitoring and/or initiating of downstream actions. The computing component 900 may be implemented as the computing system 102 of FIGS. 1, 2A, 2B, 2C, 3 and 4A-4B. The processors 902 may be implemented as the processors 103 of FIGS. 1, 2A, 2B, 2C, 3 and 4A-4B. The machine-readable storage media 904 may be implemented as the machine-readable storage media 112 of FIGS. 1, 2A, 2B, 2C, 3, and 4A-4B, and may include suitable machine-readable storage media described in FIG. 10.

At step 906, the processor(s) 902 may execute machine-readable/machine-executable instructions stored in the machine-readable storage media 904 to obtain images or templates (e.g., the image 150 in FIG. 1), for example, from a registry. The images or templates include logic, dependencies, and libraries in order to execute an application. The images or templates represent schemas of containers or other infrastructure. The images or templates include an executable bundle encompassing binary data, which encapsulates an application and any dependencies. The images or templates may be separated into segments, divisions, portions, or compartments, such as layers.

At step 908, the processor(s) 902 may execute machine-readable/machine-executable instructions stored in the machine-readable storage media 904 to extract segments (e.g., the layers 152, 154, 156, and 158 in FIGS. 1 and 2A-2C) from the images or templates.

At step 910, the processor(s) 902 may execute machine-readable/machine-executable instructions stored in the machine-readable storage media 904 to extract files (e.g., the files 272, 282, 276, 286, and 288 in FIGS. 1 and 2A-2C) from the layers.

At step 912, the processor(s) 902 may execute machine-readable/machine-executable instructions stored in the machine-readable storage media 904 to store a single copy of each file while skipping storage of any repeated instances, within an archive (e.g., the archive 240 in FIGS. 2A-2C). This archive is a compressed version of files within the image 150.

At step 914, the processor(s) 902 may execute machine-readable/machine-executable instructions stored in the machine-readable storage media 904 to store metadata (e.g., the metadata 252, 254, 256, 258, and 260 in FIGS. 2A-2C) within the archive. The metadata 252, 254, 256, and 258 may include constituent files within each of the respective layers 152, 154, 156, and 158 to reconstruct the layers from the stored single copy of each file. The metadata 260 may include constituent layers within the image 150 and relationships between each of the layers.

At step 916, the processor(s) 902 may execute machine-readable/machine-executable instructions stored in the machine-readable storage media 904 to simulate a reconstruction of the layers from the archive based on the metadata. If the simulated reconstruction matches the image 150 byte-for-byte, then the archive 240 may be transmitted to a different computing system, for example, in a secured computing environment, as shown in FIG. 5, to reduce a transport and processing footprint. Otherwise, an uncompressed version of the image 150 may be transmitted to the different computing system.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software. Operating systems control and schedule computer processes for execution, perform memory management, provide file system, networking, I/O services, and provide a user interface functionality, such as a graphical user interface ("GUI"), among other things.

Figure 10:
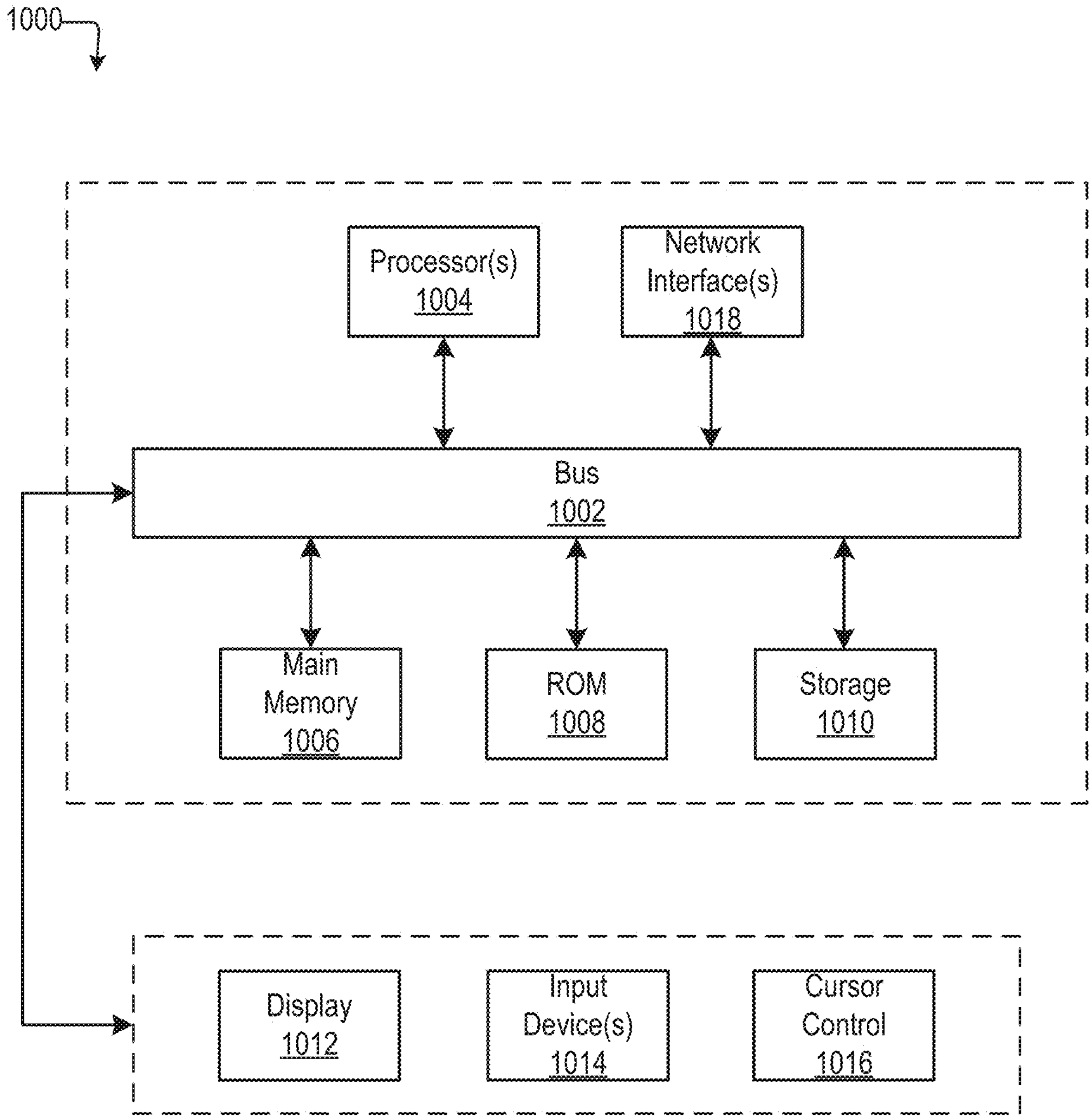
FIG. 10 illustrates a block diagram of an example computer system in which any of the embodiments described herein may be implemented.

FIG. 10 is a block diagram that illustrates a computer system 1000 upon which any of the embodiments described herein may be implemented. In some examples, the computer system 1000 may include a cloud-based or remote computing system. For example, the computer system 1000 may include a cluster of machines orchestrated as a parallel processing infrastructure. The computer system 1000 includes a bus 1002 or other communication mechanism for communicating information, one or more hardware processors 1004 coupled with bus 1002 for processing information.

Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may retrieves and executes the instructions. The instructions received by main memory 1006 may optionally be stored on storage device 1010 either before or after execution by processor 1004.

The computer system 1000 also includes a communication interface 1018 coupled to bus 1002. Communication interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network(s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be removed, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that "logic," a "system," "data store," and/or "database" may comprise software, hardware, firmware, and/or circuitry. In one example, one or more software programs comprising instructions capable of being executable by a processor may perform one or more of the functions of the data stores, databases, or systems described herein. In another example, circuitry may perform the same or similar functions. Alternative embodiments may comprise more, less, or functionally equivalent systems, data stores, or databases, and still be within the scope of present embodiments. For example, the functionality of the various systems, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any figure or example can be combined with one or more features of any other figure or example. A component being implemented as another component may be construed as the component being operated in a same or similar manner as the another component, and/or comprising same or similar features, characteristics, and parameters as the another component.

The phrases "at least one of," "at least one selected from the group of," or "at least one selected from the group consisting of," and the like are to be interpreted in the disjunctive (e.g., not to be interpreted as at least one of A and at least one of B).

Reference throughout this specification to an "example" or "examples" means that a particular feature, structure or characteristic described in connection with the example is included in at least one example of the present invention. Thus, the appearances of the phrases "in one example" or "in some examples" in various places throughout this specification are not necessarily all referring to the same examples, but may be in some instances. Furthermore, the particular features, structures, or characteristics may be combined in any suitable manner in one or more different examples.

The invention claimed is:

1. A computing system, comprising:

one or more processors; and memory storing instructions that, when executed by the one or more processors, cause the computing system to perform:

obtaining one or more images, wherein the images comprise an executable bundle, the executable bundle comprising logic, dependencies, and libraries to deploy an application;

extracting layers from each of the images, wherein at least one of the layers is repeated within the images;

extracting segments from each of the layers, wherein at least one of the segments is repeated within the layers and across the layers;

generating a compressed version of the images by selectively copying, into an archive, a single copy of each file within the layers and across the layers and a single copy of each layer within the images, wherein, in the compressed version, any repeated files are removed from each of the layers and across the layers and any repeated layers are removed across the images;

storing, within the compressed version, metadata to reconstruct the layers from the segments and the images from the layers, wherein the metadata identifies a number of instances of the repeated files and a number of instances of the repeated layers, and the metadata further identifies a sequential order of construction of the layers; and selectively transmitting the compressed version of the images to a different computing system.

2. The computing system of claim 1, wherein the images each represent a schema of a container, wherein the container comprises a construct that stores and organizes at least a portion of the application.

3. The computing system of claim 2, wherein each container comprises immutable layers and a writable layer that records any changes to the immutable layers.

4. The computing system of claim 1, wherein the metadata comprises a difference between a first layer of the layers and a second layer of the layers, wherein the first layer and the second layer have at least one file in common.

5. The computing system of claim 1, wherein the instructions further cause the computing system to perform:

generating an interface that includes windows; and upon receiving a selection of a tab corresponding to a window of the windows, populating information comprising different versions and statuses of the images.

6. The computing system of claim 5, wherein the information comprises a version, a size, and a status of the images.

7. The computing system of claim 5, wherein the instructions further cause the computing system to perform:

upon receiving a selection of any portion of the information, populating contents of an image corresponding to the selected information.

8. The computing system of claim 7, wherein the contents comprise metadata of the image.

9. The computing system of claim 1, wherein the instructions further cause the computing system to perform:

generating a log of one or more rollbacks in the images, layers, or files.

10. The computing system of claim 1, wherein the generating of the compressed version comprises:

storing the single copy of each segment within the archive;

iteratively storing a single copy of each segment until an amount of stored segments in the archive reaches a threshold storage amount; and when the amount of stored segments in the archive reaches the threshold storage amount, storing any additional segments in a different archive.

11. The computing system of claim 1, wherein one of the layers comprises an operating system kernel layer as a foundation upon which other layers are built.

12. A computer-implemented method of a computing system, the computer-implemented method comprising:

obtaining one or more images, wherein the images comprise an executable bundle, the executable bundle comprising logic, dependencies, and libraries to deploy an application;

extracting layers from each of the images, wherein at least one of the layers is repeated within the images;

extracting segments from each of the layers, wherein at least one of the segments is repeated within the layers and across the layers;

generating a compressed version of the images by selectively copying, into an archive, a single copy of each file within the layers and across the layers and a single copy of each layer within the images, wherein, in the compressed version, any repeated files are removed from each of the layers and across the layers and any repeated layers are removed across the images;

storing, within the compressed version, metadata to reconstruct the layers from the segments and the images from the layers, wherein the metadata identifies a number of instances of the repeated files and a number of instances of the repeated layers, and the metadata further identifies a sequential order of construction of the layers; and selectively transmitting the compressed version of the images to a different computing system.

13. The computer-implemented method of claim 12, wherein the images each represent a schema of a container, wherein the container comprises a construct that stores and organizes at least a portion of the application.

14. The computer-implemented method of claim 13, wherein each container comprises immutable layers and a writable layer that records any changes to the immutable layers.

15. The computer-implemented method of claim 12, wherein the metadata comprises a difference between a first layer of the layers and a second layer of the layers, wherein the first layer and the second layer have at least one file in common.

16. The computer-implemented method of claim 12, further comprising:

generating an interface that includes windows; and upon receiving a selection of a tab corresponding to a window of the windows, populating information comprising different versions and statuses of the images.

17. The computer-implemented method of claim 16, wherein the information comprises a version, a size, and a status of the images.

18. The computer-implemented method of claim 16, further comprising:

upon receiving a selection of any portion of the information, populating contents of an image corresponding to the selected information.

19. The computer-implemented method of claim 12, further comprising:

generating a log of one or more rollbacks in the images, layers, or files.

20. The computer-implemented method of claim 12, wherein the generating of the compressed version comprises:

storing the single copy of each segment within the archive;

iteratively storing a single copy of each segment until an amount of stored segments in the archive reaches a threshold storage amount; and when the amount of stored segments in the archive reaches the threshold storage amount, storing any additional segments in a different archive.

* * * * *